United States Patent [19]

Sammells et al.

[11] 4,388,162

[45] Jun. 14, 1983

[54] CONTINUOUS FLOW ELECTROCHEMICAL CELL AND PROCESS

[75] Inventors: Anthony F. Sammells, Naperville; Michael R. St. John, Chicago, both of Ill.

[73] Assignee: Institute of Gas Technology, Chicago, Ill.

[21] Appl. No.: 346,748

[22] Filed: Feb. 8, 1982

[51] Int. Cl.³ .................. C25B 1/10; C25B 3/02; C25B 9/04

[52] U.S. Cl. .................. 204/78; 204/101; 204/129; 204/260

[58] Field of Search .............. 204/260–261, 204/129, 131, 136, 101, 78

[56] References Cited

U.S. PATENT DOCUMENTS 3,984,303 10/1976 Peters et al. .................. 204/260
4,319,971 3/1982 Good et al. .................. 204/260

*Primary Examiner*—R. L. Andrews
*Attorney, Agent, or Firm*—Thomas W. Speckman

[57] ABSTRACT

A continuous electrolyte flow electrochemical cell having an outer tubular shaped electrode, a central electron conducting current collector shaft extending through the central portion of the tubular electrode, the current collector shaft having projecting radially therefrom a plurality of electron conducting extensions spaced to permit flow of liquid electrolyte therethrough forming a counterelectrode. In a preferred embodiment the outer tubular electrode is separated from the inner counterelectrode by a concentric tubular shaped separator permitting separated flow of two electrolytes therethrough, one through the annular electrolyte space between the separator and the electrode, and a second through the tubular counterelectrode chamber within the separator. The invention provides a high efficiency, continuous electrolyte flow electrochemical cell particularly well suited for use in heterogeneous electrochemical reaction processes, such as coal depolarized water electrolysis. In one embodiment, the counterelectrode may be rotated by attachment of a rotating means to the current collector shaft.

17 Claims, 1 Drawing Figure

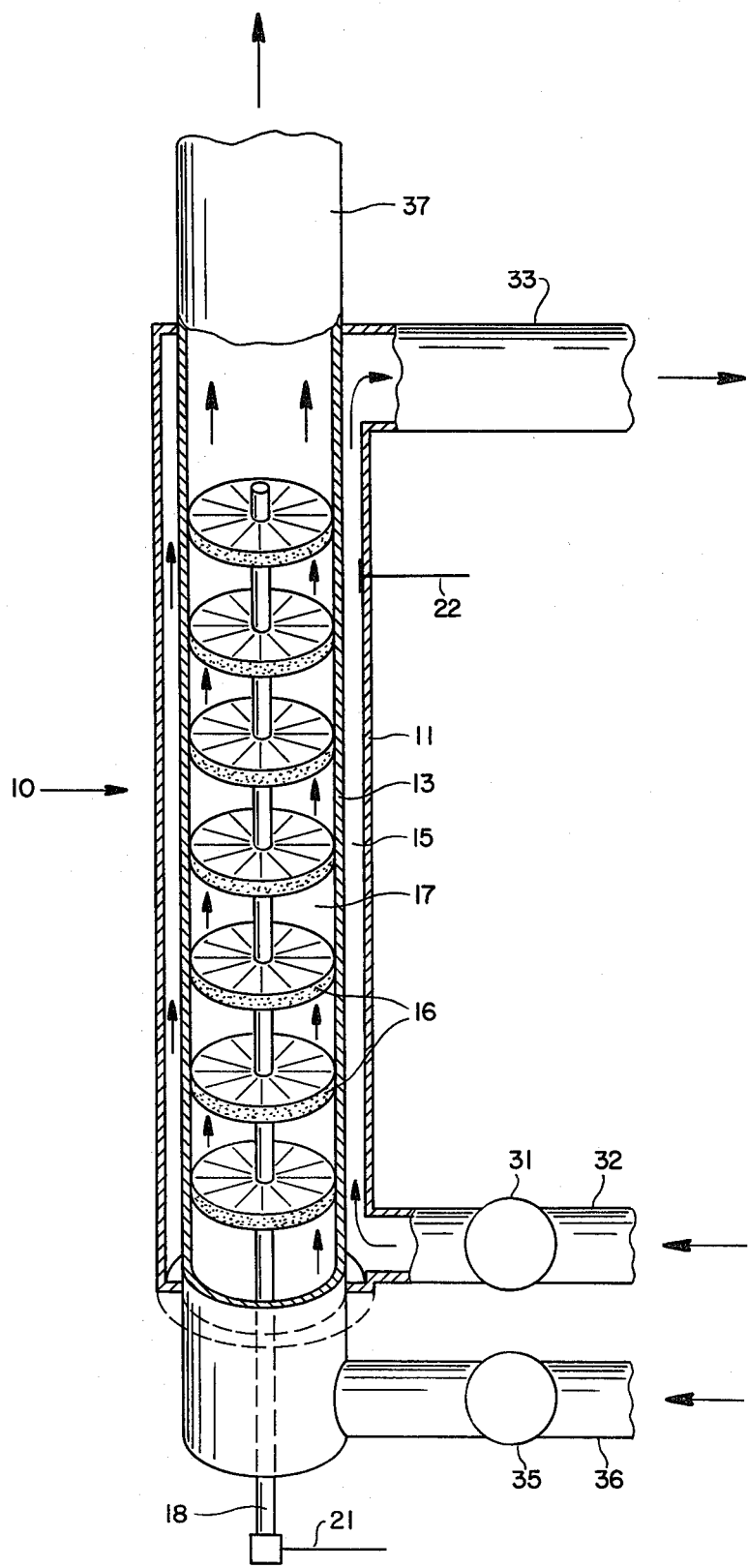

CONTINUOUS FLOW ELECTROCHEMICAL CELL AND PROCESS

BACKGROUND OF THE INVENTION

1. Field of the Invention

This invention relates to a continuous electrolyte flow electrochemical cell and process. A high efficiency continuous electrolyte flow electrochemical cell suitable for use in commercial electrochemical reaction processes is disclosed having a brush-type anode which makes the apparatus particularly well suited for use in heterogeneous electrochemical reaction processes, such as coal depolarized water electrolysis.

2. Description of the Prior Art

Heterogeneous electrochemical processes have been conducted under various conditions and in various types of electrochemical cells. For example, U.S. Pat. No. 3,556,749 teaches a method for conversion of coal to methane wherein the hydrogen is supplied to the process by the dissociation of water vapor in solid oxygen-ion electrolyte cells. Hydrogen production from coal by electrolysis in aqueous acid electrolyte at low voltage is described in R. W. Coughlin and M. Farooque, "Hydrogen Production From Coal, Water and Electrons", Nature 279, 301–303 (1979). The disclosed apparatus is a batch electrochemical cell which is not practical for commercial operation which must be capable of continuous operation. U.S. Pat. No. 4,045,313 teaches the oxidative electrolysis of carbonaceous slurries, such as oil shale, coal and various bitumens, to produce carboxylic acids and alcohols. The oxidative electrolysis is carried out in a continuous flow electrolyte cell having a central stationary anode with multiple platinum gauze discs and a concentric cathode in a cathode chamber separated from the anode chamber by a diaphram impermeable to the slurry solids. British Pat. No. 147,834 teaches increased efficiency in extraction of oils from fatty substances by an electric current in a cell having a central carbon rod electrode and a concentric pipe as the other electrode wherein the reactant material is maintained in progressive movement from the intake end to the discharge end to insure continual changes in the material in contact with the electrode surfaces.

SUMMARY OF THE INVENTION

The continuous flow electrochemical cell of this invention comprises an outer tubular shaped electrode, a central electron conducting current collector shaft extending through the central portion of the tubular electrode for substantially the full length of the tubular electrode, the current collector shaft having projecting radially therefrom a plurality of electron conducting extensions spaced to permit flow of liquid electrolyte therethrough forming a counterelectrode, and pumping means for providing movement of a liquid electrolyte through the tubular shaped electrochemical cell. In a preferred embodiment, the outer tubular electrode is separated from the inner counterelectrode by a concentric tubular shaped separator forming an annular electrolyte chamber between the separator and the electrode and a tubular second electrolyte chamber within the separator. In one embodiment, rotational means are provided which are capable of rotating said current collector shaft and said counterelectrode. Pumping means may be separately provided for movement of the liquid electrolytes, the liquid catholyte and the liquid anolyte. This invention provides a process for hydrogen production by coal depolarized water electrolysis wherein a slurry of solid coal particles is continuously passed through a central anolyte chamber of such a tubular electrochemical cell contacting the rotating anode, oxidizing carbonaceous components of the coal and forming hydrogen ions which are passed through an electrolyte to an outer tubular cathode where molecular hydrogen is formed. The oxidized carbonaceous component of coal in slurry form and hydrogen may be continuously withdrawn from the tubular electrochemical cell. In a preferred embodiment of the process for hydrogen production, a tubular separator is maintained between the anode and the cathode to retain sulfur oxidation products on the anode side of the separator.

The brush-type anode electrochemical cell of this invention improves cell efficiency by increasing reactant proximity and contact in the heterogeneous chemical reaction system.

It is an object of this invention to provide a continuous flow electrochemical cell apparatus and process.

It is another object of this invention to provide a high efficiency electrochemical cell apparatus suitable for use in commercial electrochemical processes.

It is yet another object of this invention to provide an electrochemical cell apparatus that is particularly well suited for use in heterogeneous electrochemical processes.

Still another object of this invention is to provide a process for hydrogen production by coal depolarized water electrolysis.

BRIEF DESCRIPTION OF THE DRAWING

The above and other objects, advantages and features of this invention will become apparent from the following description of specific preferred embodiments together with the drawing, wherein:

The FIGURE shows a partially sectioned schematic view of an electrochemical cell according to one embodiment of this invention.

DESCRIPTION OF PREFERRED EMBODIMENTS

Referring to the FIGURE, continuous flow tubular shaped electrochemical cell 10 has outer tubular shaped cathode 11 and inner tubular shaped separator 13 forming annular catholyte chamber 15 between separator 13 and cathode 11 and forming tubular anolyte chamber 17 within separator 13. Central electron conducting current collector shaft 18 extends through the central portion of anolyte chamber 17 and for substantially the full length of cathode 11. Current collector shaft 18 has projecting radially from it a distance substantially to separator 13 a plurality of electron conducting extensions spaced to permit flow of liquid anolyte therethrough forming brush-type anode 16. A rotational means, such as an electric motor, may be engaged with current collector shaft 18 to provide desired rotation to shaft 18 and thus to brush-type anode segments 16.

Electrolyte is supplied to catholyte chamber 15 by catholyte supply line 32 and the flow rate through annular catholyte chamber 15 is controlled by pumping means 31. The electrolyte enters catholyte chamber 15 at one end and flows through the catholyte chamber in contact with separator 13 on one side and cathode 11 on the other side and exists via discharge line 33, providing a continuous flow of electrolyte through catholyte chamber 15 providing fresh electrolyte and fresh electrochemical active species to contact cathode 11 while at the same time removing from the electrochemically active area products of the electrochemical reaction.

Likewise, liquid electrolyte which may carry in slurry form electrochemically active material is supplied to anolyte chamber 17 through supply line 36 and the flow rate controlled by pumping means 35. The electrolyte continuously flows through anolyte chamber 17 passing in intimate contact with brush-type anode segments 16 and the inner surface of separator 13 and leaves the electrochemical cell by discharge line 37.

It is thus observed that the electrolytes pass through catholyte chamber 15 and anolyte chamber 17 may be the same or different. For example, the electrochemical cell of this invention is particularly well suited for heterogeneous electrochemical reactions, such as passing a solids-liquid slurry electrolyte through anolyte chamber 17. The revolving brush-type anodes provide both mixing and high surface area contact for electrochemical reaction with solids in a solid-liquid slurry electrolyte. In the electrochemical cell shown in the FIGURE, product recovery and treatment of the electrolyte for recycle is easily obtained due to separation of the anode and cathode chambers.

Cathode 11 may be made of any electrically conducting material suitable for enhancement of the desired cathodic electrochemical reaction. The entire tubular shape may be fabricated from the desired cathode material or the tubular shape may be coated on its interior with the desired cathode material by methods well known in the art. Suitable cathode materials include nickel, platinum, platinized platinum, platinum-tungsten, platinum-tantalum, and well know Raney alloys. The cathode 11 is suitably connected to cathode electrical lead 22 for supply of electrical power.

Anode 16 may likewise be made of any electrically conducting material suitable for enhancement of the desired anodic electrochemical reaction. The electron conducting extensions from the current collector making up the brush-type anode may be fabricated from the desired anode material or the desired anode active material may be a coating upon a supporting substrate forming the brush-like extensions from current collector shaft 18. To enhance contact between electrochemically active solids in the flowing electrolyte, the electrolyte, and the anode surface, it is desired that the plurality of electron conducting extensions be spaced so as to permit flow of the liquid electrolyte carrying the solid material therethrough. Thus, the desired spacing between the individual extensions forming the brush-type anode may be varied dependent upon the solid sizing in the electrolyte slurry. Contact between the electrolyte, solids contained therein, and the anode, may be enhanced by the anode having a plurality of common planar extensions forming a series of anode segments spaced along the length of the current collector shaft as shown in the FIGURE. It is preferred that about 2 to about 8 such anode segments be spaced along the current collector shaft. Suitable anode materials include nickel, platinum, tungsten, ruthenium, tantalum, lead, palladium, graphite, ruthenium oxides and nickel oxides. Current collector shaft 18 is electrically connected to anode electrical lead 21 for supply of electric power. The portion of anode shaft 18 extending to contact the rotational means is preferably insulated from the active electron transport portion of current collector shaft 18.

Contact of electrochemically active material in electrolyte flowing through the anolyte compartment 17 may be further enhanced by rotation of current collector shaft 18 and anode segments 16. Optimal rotational speed of the anode will vary with the size of particulates carried by the electrolyte slurry and the rate of flow of the electrolyte.

Separator 13 may be a cationic conducting membrane-type separator such as Nafion (a sulfonated penfluoropolyethylene sold by DuPont), nitrocellulose, cellulose acetate, and other fluorocarbon ion exchange membranes, or a mechanical separator such as sintered polyvinylchloride, sintered porous alumina, Duramic sold by W. R. Grace Company, and sintered porous ceramics of a pore size of about 50 to about 100 microns. Separator 13 serves to readily separate the electrochemical reaction products so that later separations are simplified. Mechanical separators are practical when using the same type of electrolyte in both the anolyte and catholyte chambers to prevent solids from passing from the anolyte chamber to the catholyte chamber and for retaining within the anolyte chamber undesirable electrochemical reaction products, such as sulfur oxidation products in the case of anode depolarization by naturally occurring carbonaceous materials such as coal, to prevent cathode poisoning which may otherwise occur.

Suitable electrolytes for use in the electrochemical cell and process of this invention include aqueous acidic electrolytes, preferably those wherein the acid is selected from the group consisting of hydrochloric, sulfuric, perchloric and phosphoric acids. Suitable acid concentration in the aqueous electrolytes is about 0.1 to 10 Molar, preferably about 0.5 to 1.5 Molar. Suitable aqueous basic electrolytes include those having a base concentration of about 0.1 to 6 Molar, preferably wherein the base is selected from the group consisting of sodium hydroxide and potassium hydroxide. It is preferred that the concentration of base in the electrolyte be about 0.5 to 1.0 Molar.

The electrochemical cell may be operated at ambient pressures and preferably at somewhat higher than ambient temperatures to promote the electrochemical reactions. Temperatures of above about 50° C. are suitable and preferred temperatures are in the range of about 70° to 90° C.

One of the important features of this invention is the reduction of power requirements for production of hydrogen by water electrolysis. This is achieved by the enhanced solids, electrolyte, anode contact and anode depolarization with organic carbonaceous solids, such as coal or oxidizable biomass product with electrical potentials of less than about 1.5 volts. Conventional water electrolysis requires about 1.5 to 2.0 volts. According to the process of this invention, electrical potential of about 0.5 to about 1.0 volts is suitable in the production of hydrogen. Hydrogen production by biomass product depolarized water electrolysis is more fully described in allowed U.S. patent application, Ser. No. 234,692, filed Feb. 17, 1981, now U.S. Pat. No. 4,341,608 and incorporated herein by reference.

The continuous flow tubular shaped electrochemical cell of this invention is particularly well suited for production of hydrogen by water electrolysis as it is inherent in its design that the cathode surface is larger than the anode surface for cathodic reaction emphasis.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for hydrogen production by water electrolysis comprising:

continuously passing an anolyte comprising acidic aqueous slurry of solid organic carbonaceous particles through a central elongated anolyte chamber of a tubular electrochemical cell formed by an elongated tubular hydrogen ion permeable separator contacting an anode comprising a plurality of brush-type electron conducting extensions attached in electrical communication to a coaxial central electron conducting current collector shaft and projecting radially therefrom a distance substantially to said separator oxidizing the carbonaceous component of said solid organic carbonaceous particles forming hydrogen ions and oxidized carbonaceous material;

continuously passing a catholyte comprising an aqueous acidic solution through an annular catholyte chamber surrounding said anolyte chamber and defined by said hydrogen ion passing separator and a coaxial outer elongated electrolyte retaining tubular cathode;

passing said hydrogen ions through said anolyte, separator, and catholyte to said tubular cathode where molecular hydrogen is formed; and continuously withdrawing said oxidized carbonaceous material from said anolyte chamber and said hydrogen from said catholyte chamber.

2. The process of claim 1 wherein said anode is rotating.

3. The process of claim 1 wherein said oxidation products are retained on the anode side of said separator.

4. The process of claim 3 wherein said plurality of anode forming extensions comprise a plurality of common planar extensions forming anode segments, said anode segments are spaced along the length of said current collector shaft.

5. The process of claim 3 wherein said separator comprises a cationic conducting membrane.

6. The process of claim 3 wherein said separator comprises a mechanical separator.

7. The process of claim 3 wherein said organic carbonaceous solids comprise coal and said anode forming extensions are spaced to permit flow of said solids therethrough.

8. The process of claim 3 wherein said organic carbonaceous solids comprise biomass product and said anode forming extensions are spaced to permit flow of said solids therethrough.

9. A continuous flow tubular shaped electrochemical cell comprising:

an outer elongated tubular shaped catholyte retaining cathode;

an inner coaxial elongated tubular shaped separator concentric to said cathode forming an annular catholyte chamber between said separator and said cathode and a tubular anolyte chamber within said separator;

pumping means for providing movement of a liquid catholyte through said catholyte chamber;

a coaxial elongated central electron conducting current collector shaft extending through the central portion of said anolyte chamber and for substantially the full length of said cathode, said current collector shaft having projecting radially therefrom a distance substantially to said separator across said anolyte chamber a plurality of brush-type electron conducting extensions spaced to permit flow of a liquid anolyte therethrough, forming an anode; and pumping means for providing movement of a liquid anolyte through said anolyte chamber.

10. The electrochemical cell of claim 9 wherein said plurality of anode forming extensions comprise a plurality of common planar extensions forming anode segments, said anode segments are spaced along the length of said current collector shaft.

11. The electrochemical cell of claim 9 wherein said separator comprises a cationic conducting membrane.

12. The electrochemical cell of claim 9 wherein said separator comprises a mechanical separator.

13. The electrochemical cell of claim 9 wherein said anode forming extensions are spaced to permit flow of an anolyte comprising a slurry of solids therethrough.

14. The electrochemical cell of claim 9 wherein said central electron conducting current collector shaft is in rotational relation to a rotational means capable of rotating said shaft.

15. In a continuous flow tubular shaped electrochemical cell; an outer elongated tubular shaped electrolyte retaining electrode, an inner coaxial elongated tubular shaped separator concentric to said electrode forming an annular first electrolyte chamber between said separator and said electrode and a tubular second electrolyte chamber within said separator, and a central electron conducting current collector shaft extending coaxially through the central portion of said tubular electrode for substantially the full length of said tubular electrode, said current collector shaft having projecting radially therefrom a distance substantially to said separator through said second electrolyte chamber a plurality of brush-type electron conducting extensions spaced to permit flow of liquid electrolyte therethrough forming a counterelectrode.

16. The electrochemical cell of claim 15 wherein said current collector shaft is in rotational relation to a rotational means capable of rotating said shaft.

17. The electrochemical cell of claim 15 wherein said plurality of counterelectrode forming extensions comprise a plurality of common planar extensions forming counterelectrode segments, said segments being spaced along the length of said current collector shaft.

* * * * *